(12) United States Patent
Han

(10) Patent No.: US 10,409,617 B2
(45) Date of Patent: Sep. 10, 2019

(54) BIOS SWITCHING DEVICE

(71) Applicants: INVENTEC (PUDONG) TECHNOLOGY CORPORATION, Shanghai (CN); INVENTEC CORPORATION, Taipei (TW)

(72) Inventor: Ying-Xian Han, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 63 days.

(21) Appl. No.: 15/870,391

(22) Filed: Jan. 12, 2018

(65) Prior Publication Data

US 2019/0065210 A1 Feb. 28, 2019

(30) Foreign Application Priority Data

Aug. 23, 2017 (CN) .......................... 2017 1 0729812

(51) Int. Cl.
*G06F 9/44* (2018.01)
*G06F 11/14* (2006.01)
*G06F 9/4401* (2018.01)

(52) U.S. Cl.
CPC ........ *G06F 9/4401* (2013.01); *G06F 11/1417* (2013.01)

(58) Field of Classification Search
CPC .......................... G06F 9/4401; G06F 11/1417
See application file for complete search history.

(56) References Cited

U.S. PATENT DOCUMENTS

| 9,542,195 | B1* | 1/2017 | Astarabadi | G06F 9/4411 |
| 9,569,226 | B2* | 2/2017 | Chung | G06F 9/4408 |
| 2003/0076311 | A1* | 4/2003 | Lin | G06F 3/14 345/204 |
| 2014/0181799 | A1* | 6/2014 | Mangal | G06F 8/654 717/168 |

* cited by examiner

*Primary Examiner* — Stefan Stoynov
(74) *Attorney, Agent, or Firm* — Maschoff Brennan

(57) ABSTRACT

A BIOS switching device adapted to a server comprises a switching module, a CPLD, a storage module and a BMC. The switching module comprises a movable switching element locating at a first position or at a second position and a plurality of hardware pins. The hardware pins are logical low when the switching element locates at the second position and remains unchanged logical level when the switching element locates at the first position. The CPLD electrically connects to the switching module, comprising a plurality of input signals respectively coupled to the plurality of hardware pins. The CPLD generates an output signal according to the plurality of input signals. The BMC activates a first BIOS or a second BIOS from the storage module according to the logical level of the output signal of the CPLD.

8 Claims, 2 Drawing Sheets

BIOS SWITCHING DEVICE

CROSS-REFERENCE TO RELATED APPLICATIONS

This non-provisional application claims priority under 35 U.S.C. § 119(a) on Patent Application No(s). 201710729812.3 filed in China on Aug. 23, 2017, the entire contents of which are hereby incorporated by reference.

TECHNICAL FIELD

This disclosure relates to a BIOS switching device, particularly to the BIOS switching device adapted to a server.

RELATED ART

The BIOS (Basic Input Output System) is a non-volatile firmware used to perform hardware initialization during the booting process (power-on startup). The BIOS takes charge of the configuration and the control of the bottom level hardware. In general, the BIOS preserves the configuration message, executes a POST (Power On Self Test), activates the bootstrap program and loads the operating system into the main memory after the computer is power-on. Therefore, the BIOS plays an important role during the computer's booting time, especially for the servers with less fault-tolerant.

Practically, the BIOS is stored in the ROM (Read Only Memory) on the motherboard of the server or of the personal computer. However, the system cannot read the correct BIOS program if the BIOS image file stored in the ROM is crashed. Even if the BIOS have a slight error, it may result in failure of the booting procedure, and cause an unpredictable loss.

SUMMARY

According to one or more embodiments of this disclosure, a BIOS switching device adapted to a server, comprising: a switching module, comprising a switching element, a first position, a second position and a plurality of hardware pins, wherein the switching element is switchably located in the first position or in the second position, the plurality of hardware pins are logical low when the switching element is in the second position, and the logic levels of the plurality of hardware pins remain unchanged when the switching element is in the first position; a CPLD electrically connecting to the switching module, wherein the CPLD has a plurality of input signals respectively coupled to the plurality of hardware pins, the CPLD generates a logic output signal according to the plurality of input signals, and the logic output signal is at a first logic level or is at a second logic level; a storage module configured to store a first BIOS and a second BIOS; and a BMC electrically connecting to the storage module and the CPLD, wherein the BMC is configured to receive the logic output signal, the BMC selectively activates one of the first BIOS and the second BIOS, the BMC activates the first BIOS when the logic output signal is at the first logic level, and the BMC activates the second BIOS when the logic output signal is at the second logic level.

According to one or more embodiments of this disclosure, the hardware pins of the BIOS switching device comprises: a firmware lock pin, indicating that a firmware's configuration is locked when the firmware lock pin is logical low; a system configuration pin, configured to indicate that a system's configuration is invalid when the system configuration pin is logical low; and an activation mode pin, configured to indicate that a system boots in legacy mode when the activation mode pin is logical low.

According to one or more embodiments of this disclosure, the storage module of the BIOS switching device is a PROM (Programmable Read Only Memory), an EPROM (Erasable Programmable Read Only Memory), an OTPROM (One Time Programmable Read Only Memory), an EEPROM (Electrically Erasable Programmable Read Only Memory) or a Flash memory.

According to one or more embodiments of this disclosure, the BIOS switching device further comprises a screen and a keyboard, wherein the screen and the keyboard electrically connect to the BMC, the screen is configured to show an text-form option list with the first BIOS and the second BIOS, the keyboard is configured to input a selection from the first BIOS and the second BIOS and to send a selection signal to the BMC, and the BMC activates the first BIOS or the second BIOS according to the selection signal rather than according to the logic output signal.

According to one or more embodiments of this disclosure, the BMC further comprises an address storage unit configured to store a first address and a second address, the address storage unit is a register, the first address denotes an address where the storage module starts to store the first BIOS and the second address denotes an address where the storage module starts to store the second BIOS.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
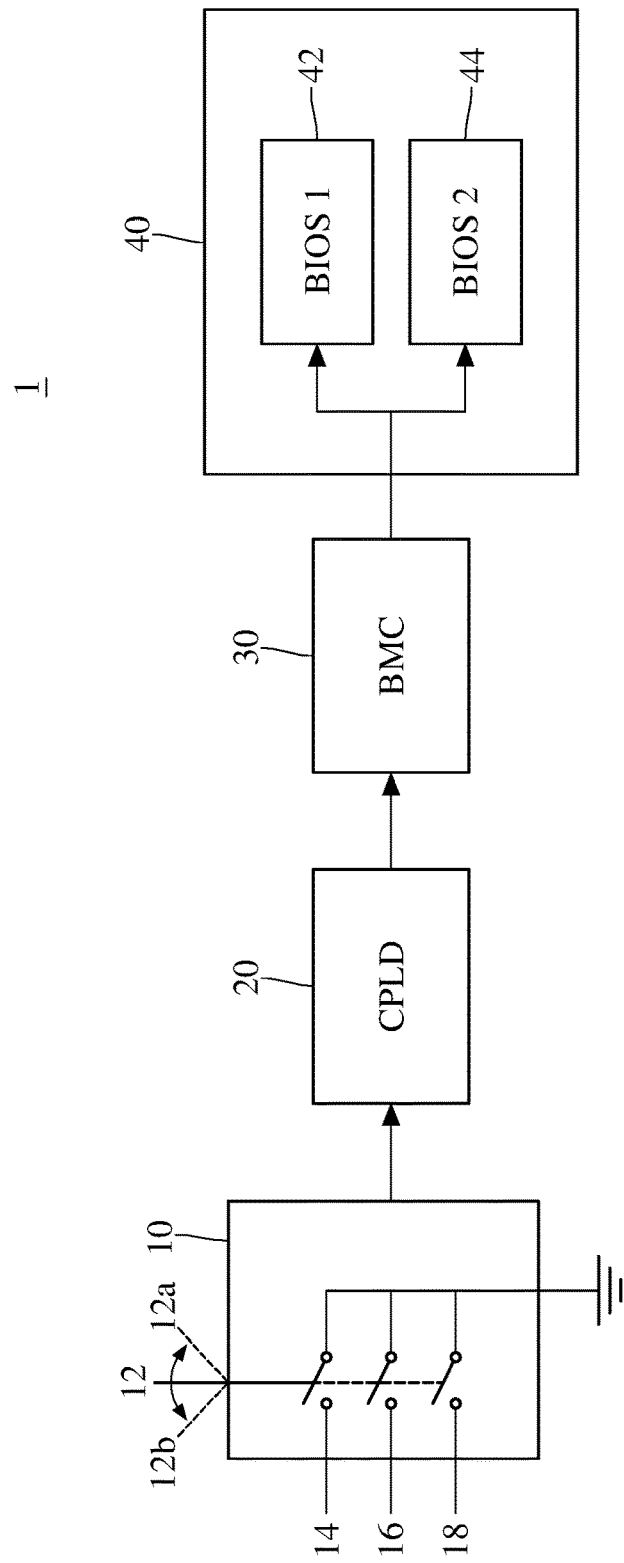
FIG. 1 is a schematic view of a BIOS switching device according to an embodiment of the present disclosure.

Please refer to FIG. 1, which is a schematic view of a BIOS switching device according to an embodiment of the present disclosure. The BIOS switching device 1 comprises a switching module 10, a CPLD (Complex Programmable Logic Device) 20, a BMC (Baseboard Management Controller) 30, and a storage module 40.

The BIOS switching module 1 comprises a switching element 12, a first position 12a, a second position 12b and a plurality of hardware pins 14, 16, and 18. The switching element 12 is switchably located in the first position 12a or in the second position 12b. Practically, the switching module 10 is such as a dip switch or a seesaw switch, and a user can use his/her finger to change the position of the switching element 12.

In an embodiment of the present disclosure, the switching module 10 can control the logic levels of three hardware pins

14, 16, and 18. These three hardware pins 14, 16, and 18 are a firmware lock pin BIOS_CONFIG_LOCK_N, a system configuration pin INVALIDATE_SYSTEM_CONFIG_N, and an activation mode pin LEGACY_BOOT_MODE_N.

The low logical level of the firmware lock pin means that the BIOS is locked due to a wrong BIOS password during loading of the BIOS, thus the BIOS is not configurable and is unable to execute the following booting procedure. The low level of the system configuration pin means that the system configuration is abnormal. The kinds of the BIOS activating modes comprise the UEFI (Unified Extensible Firmware Interface) mode and the legacy mode. The legacy mode adopts a conventional BIOS leading method, wherein the data amount and the accessing speed per reading operation are all lower than the UEFI mode. As set forth above, the low logical level of the activation mode pin means that the BIOS is activated in the legacy mode. In practical, the legacy mode is so-called DOS (Disk Operating System) activation mode.

The default logic level of the above three hardware pins 14, 16, and 18 are all logical high, and should be switched to logical low by the user when the system is abnormal. Specifically, the logical level of the aforementioned three hardware pins 14, 16, and 18 are changed from high to low when the switching element 12 is in the second position 12*b*, as shown in FIG. 1. In addition, the logic levels of the three hardware pins 14, 16, and 18 remain unchanged when the switching element is in the first position 12*a*.

The CPLD is configured to implement any kind of computations and combinational logic circuits. In an embodiment of the present disclosure, the CPLD has a plurality of input signals respectively coupled to the three hardware pins 14, 16, and 18. Furthermore, the CPLD generates a logic output signal according to the logic levels of the three hardware pins 14, 16, and 18, and the logic output signal is at a first logic level or is at a second logic level. The logic output signal is at the first logic level when any of the three hardware pins is logical high while the logic output signal is at the second logic level when all the three hardware pins are logical low. It should be noticed that the first logic level is logical high, and the second logic level is logical low in this embodiment.

The storage module 40 is configured to store two BIOS programs, one is a first BIOS 42 and another is a second BIOS 44. In an embodiment of the present disclosure, these two BIOS programs are completely identical, and the first BIOS 42 is the main BIOS while the second BIOS 44 is a backup. Practically, the first BIOS 42 and the second BIOS 44 can be different programs, and the contents of these two BIOSs are not limited in the present disclosure. The storage module 40 is such as a PROM (Programmable Read Only Memory), an EPROM (Erasable Programmable Read Only Memory), an OTPROM (One Time Programmable Read Only Memory), an EEPROM(Electrically Erasable Programmable Read Only Memory) or a Flash memory.

The BMC 30 electronically connects to the storage module 40 and to the CPLD 20. The BMC 30 determines where to read the BIOS program from the storage module 40 according to the logic output signal. The BMC selects to execute the first BIOS 42 used for the normal execution when the logic output signal is the first logic level, i.e., logical high. The BMC selects to execute the second BIOS 44 used for backup execution when the logic output signal is the second logic level, i.e., logical low.

Figure 2:
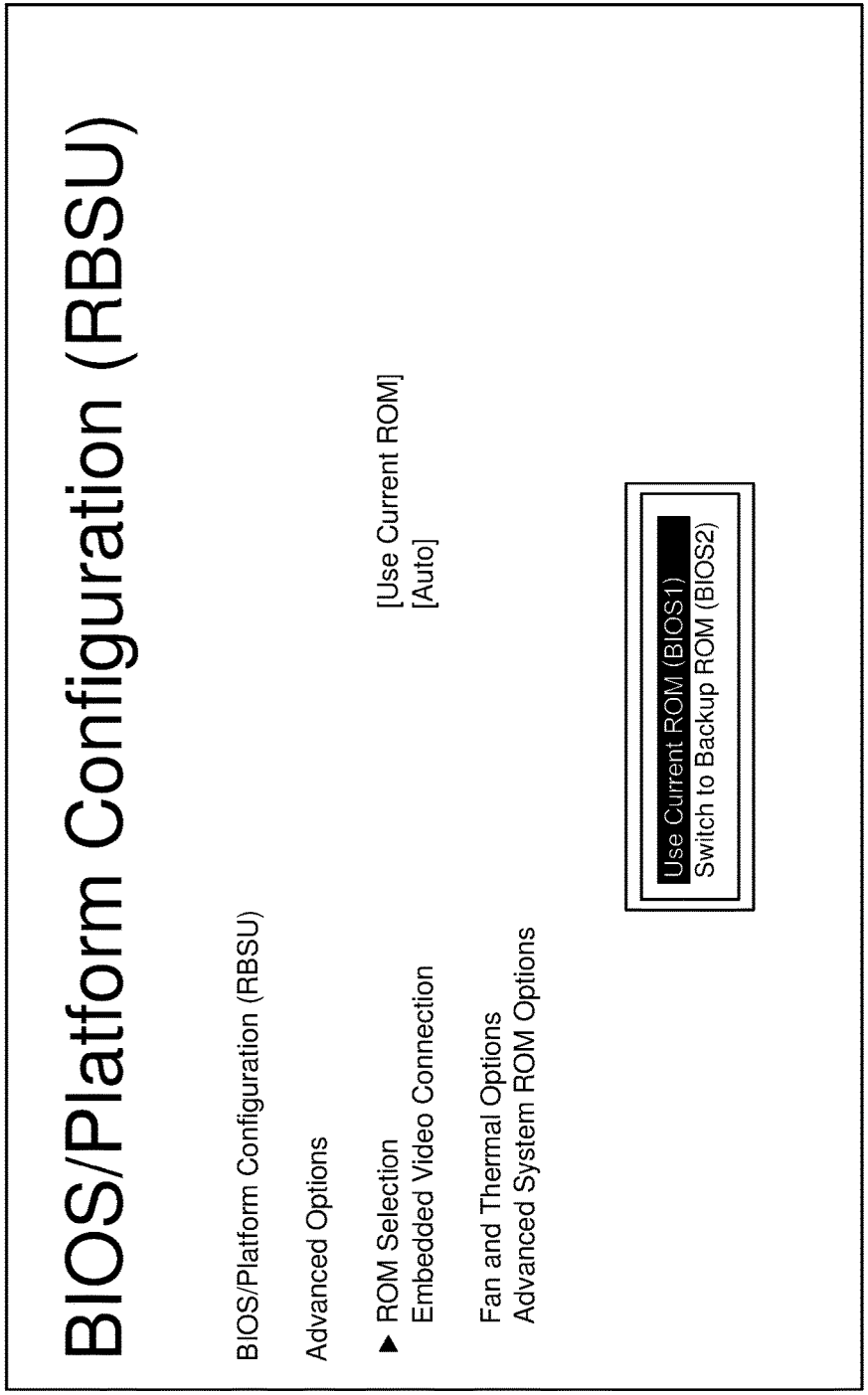
FIG. 2 is a schematic view of a text-form option list according to an embodiment of the present disclosure.

In practice, the user switches the switching module 12 of the BIOS switching device 1 from the first position 12*a* to the second position 12*b* to activate the backup BIOS when the user finds server cannot boot normally. However, the user may need another mechanism to switch the BIOS for the compatibility when the server boots normally. Please refer to FIG. 2. The BIOS switching device further comprises a screen and a keyboard. The screen and the keyboard electrically connect to the BMC. The screen is configured to show an text-form option list before the BMC 30 loads the BIOS program when the server boots normally, and the text-form option list comprises at least two options, normal BIOS and backup BIOS. The user selects one of the two options through the keyboard, and then the keyboard sends a selection signal to the BMC. The BMC activated the first BIOS or the second BIOS according to the selection signal rather than according to the logic output signal sent by the CPLD 20 for avoiding the selection conflict between the user-selected option and the switch-selected option. In addition, the BMC 30 further comprises an address storage unit in an embodiment of the present disclosure. Said address storage unit is such as a plurality of register files and is configured to store a first address and a second address, the first address denotes an address where the storage module starts to store the first BIOS and the second address denotes another address where the storage module starts to store the second BIOS. The BMC determines which address should be loaded to execute the corresponding BIOS according to the logic output signal sent by CPLD.

In sum, the present disclosure provides the BIOS switching device 1 for appending a backup BIOS in the storage module 40 under the premise of adopting the original hardware without modifying the circuit. The terminal user or the maintenance staff can easily use the switching module 12 to change to the backup BIOS (the second BIOS 44) and continue the booting procedure of the server when the original BIOS (the first BIOS 42) is crashed. Therefore, the present disclosure improves the efficiency of using the server, and reducing the maintenance cost of after-sales service.

What is claimed is:

1. A Basic Input/Output System (BIOS) switching device adapted to a server, comprising:
    a switching module, comprising a switching element, a first position, a second position and a plurality of hardware pins, wherein the switching element is switchably located in the first position or in the second position, the plurality of hardware pins are logical low when the switching element is in the second position, and logic levels of the plurality of hardware pins remain unchanged when the switching element is in the first position;
    a Complex Programmable Logic Device (CPLD) electrically connecting to the switching module, wherein the CPLD has a plurality of input signals respectively coupled to the plurality of hardware pins, the CPLD generates a logic output signal according to the plurality of input signals, and the logic output signal is at a first logic level or is at a second logic level;
    a storage module configured to store a first BIOS and a second BIOS; and
    a Baseboard Management Controller (BMC) electrically connecting to the storage module and the CPLD, wherein the BMC is configured to receive the logic output signal, the BMC selectively activates one of the first BIOS and the second BIOS, the BMC activates the first BIOS when the logic output signal is at the first logic level, and the BMC activates the second BIOS when the logic output signal is at the second logic level.

2. The BIOS switching device according to the claim 1, wherein the hardware pins comprise:
   a firmware lock pin, indicating that a firmware's configuration is locked when the firmware lock pin is logical low;
   a system configuration pin, configured to indicate that a system's configuration is invalid when the system configuration pin is logical low; and
   an activation mode pin, configured to indicate that a system boots in legacy mode when the activation mode pin is logical low.

3. The BIOS switching device according to the claim 2, wherein the firmware lock pin, the system configuration pin, and the activation mode pin are logical high when the server boots normally.

4. The BIOS switching device according to the claim 1, wherein the storage module is a PROM, an EPROM, an OTPROM, a EEPROM or a flash memory.

5. The BIOS switching device according to the claim 1, wherein the second BIOS is a backup file of the first BIOS.

6. The BIOS switching device according to the claim 1, further comprising a screen and a keyboard, wherein the screen and the keyboard electrically connect to the BMC, the screen is configured to show an option list with the first BIOS and the second BIOS, the keyboard is configured to input a selection from the first BIOS and the second BIOS and to send a selection signal to the BMC, and the BMC activates the first BIOS or the second BIOS according to the selection signal rather than according to the logic output signal.

7. The BIOS switching device according to the claim 1, wherein the BMC further comprises an address storage unit configured to store a first address and a second address, the first address denotes an address where the storage module starts to store the first BIOS and the second address denotes an address where the storage module starts to store the second BIOS.

8. The BIOS switching device according to the claim 7, wherein the address storage unit is a register.

* * * * *